April 7, 1931.  E. B. ZIMMERMAN  1,799,450
SPRING BEARING
Filed July 2, 1929   2 Sheets-Sheet 1

E. B. Zimmerman
Inventor
By Elmer Stewart
Attorney

April 7, 1931.  E. B. ZIMMERMAN  1,799,450
SPRING BEARING
Filed July 2, 1929   2 Sheets-Sheet 2
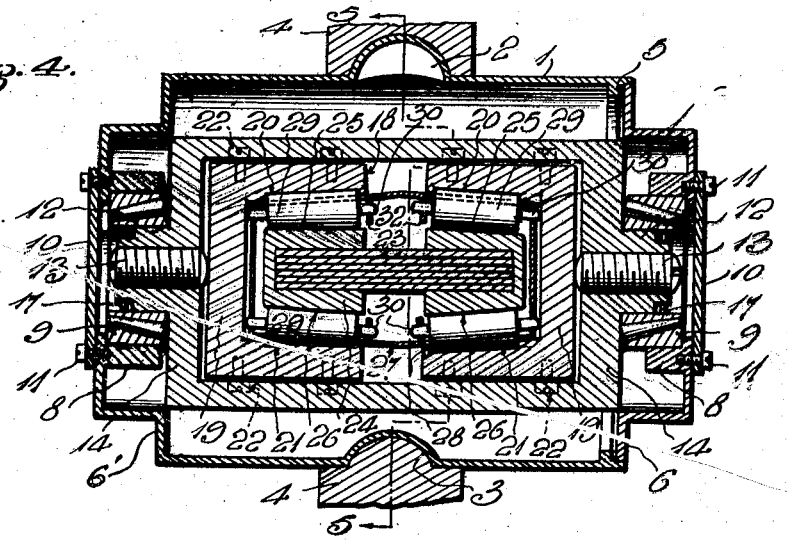
Fig. 4.
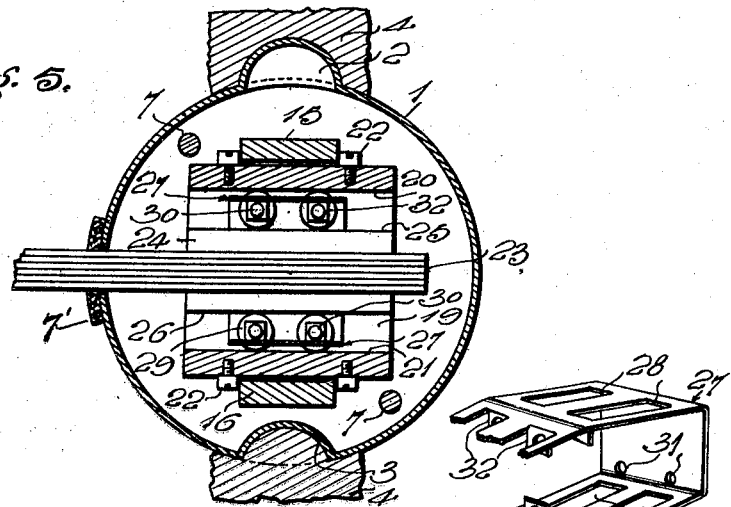
Fig. 5.
Fig. 6.
Fig. 7.
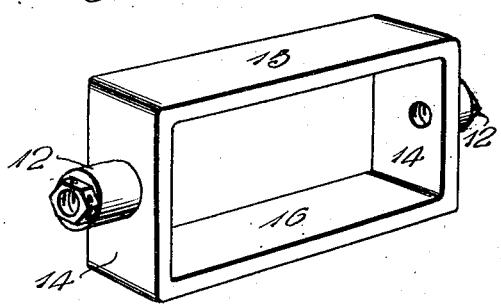
E. B. Zimmerman,
Inventor
By Elmer Stuart
Attorney Patented Apr. 7, 1931

1,799,450

UNITED STATES PATENT OFFICE

EDWARD B. ZIMMERMAN, OF PHILADELPHIA, PENNSYLVANIA

SPRING BEARING

Application filed July 2, 1929. Serial No. 375,368.

This invention relates to a spring bearing by means of which the leaf spring of an axle may be loosely connected to the frame or other part of the vehicle so that the spring will be relieved of all stresses except those which are due solely to the weight or movement of the vehicle.

More specifically an object of the invention is to provide such a connection as will allow an oscillating movement of the spring in all directions with respect to the frame member but which will not allow the spring to roll relatively to the frame.

A further object of my invention is to provide a device which will allow free longitudinal movement of the spring with respect to the frame member with provision for anti-friction bearings between the spring and the frame member.

Another object of my invention is to provide means for adjusting such bearings and for adjusting the position of the spring with relation to the frame member. In this way the roller bearing forming the anti-friction means may be tightened to remove any undesirable looseness and also the position of the spring end may be adjusted laterally of the frame and thus the alignment of the axle be indirectly corrected.

Other objects and advantages will be apparent from the following specification and the preferred form of my invention as illustrated in the accompanying drawings in which Fig. 1 is a side elevation of the device;

Fig. 4 is a vertical longitudinal section of the bearing taken on the line 4—4 of Fig. 3;

Fig. 5 is a vertical transverse section on the line 5—5 of Fig. 4;

Fig. 6 is a perspective view of the yoke and

Fig. 7 is a fragmentary perspective view of the roller bearing cage.

Figure 1:
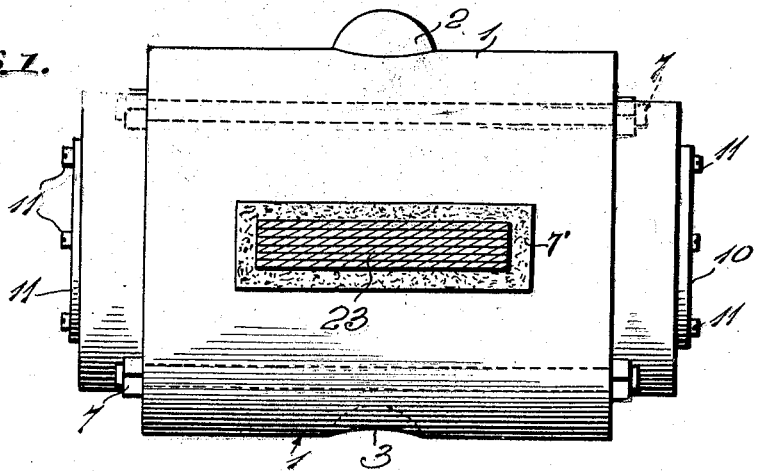
Figure 2:
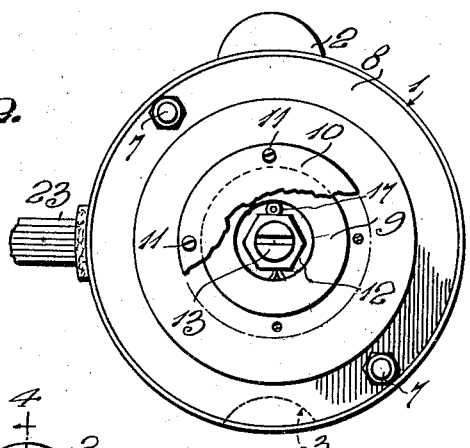
Fig. 2 is an end elevation thereof.
Figure 3:
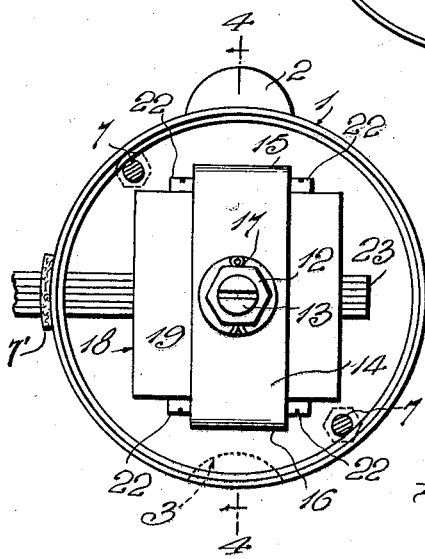
Fig. 3 is an end elevation with the end plate removed.

For purposes of illustration of the invention I have shown the preferred form thereof to include a substantially cylindrical housing 1 having on its upper side a hemispherical bearing member 2 and in its lower side a similarly shaped bearing depression 3. These elements fit upon corresponding parts 4, 4 of the frame of a vehicle. In this way the casing 1 is held firmly in place but with a freedom of movement through the bearings 2, 3 and around their vertical axis as a pivot.

The housing 1 has an internal rib 5 at one end which forms a stop member, and an end plate 6. This end plate is capable of adjustment to and from the rib 5 and is held against outward movement by the through bolts 7, 7. The opposite end 6' is shown integral with the housing 1.

A suitably packed opening 7' is provided to permit the spring to pass through the side of the housing without admitting dirt, water, etc.

Centrally of the ends 6, 6' there are provided sleeves 8, 8 which in turn form supports for the anti-friction bearings 9, 9.

I have shown a well known form of tapered roller bearing at this point, but it is to be understood that a ball bearing or other equivalent anti-friction bearing member may be used. It is essential that the bearing be of such a type that it can be adjusted for looseness by endwise displacement of one of its members. It is to provide such displacement that the end plate 6 is allowed slight freedom of movement in the barrel 1.

Thus as the bolts 7 are tightened, the plate 6 moves inwardly, carrying with it the outside of the bearing 9 until all slack in the bearing is taken up. Further tightening displaces the bearing as a whole and moves the member supported by the bearing to the left, (Fig. 4), thus adjusting the bearing in the end plate 6'.

When all undesirable slack has been taken out of the bearings in this way the tightening of the bolts 7 is of course discontinued. The outer ends of the bearings are closed by means of cover plates 10, 10 which are bolted as at 11 to the sleeves 8, 8.

The bearings 9, 9 serve as bearings for the journals or trunnions 12, 12. These trunnions are bored longitudinally and have threaded therethrough adjusting screws 13, 13. The trunnions 12, 12 are parts of the ends 14, 14 of a yoke. This yoke has an upper side 15 and a bottom 16. Suitable means such as cotter-pins 17 may be used through the ends of the trunnions 12 in order to lock the adjusting screws 13, 13, in the desired position. This yoke is permitted by trunnions 12 and anti-friction bearings 9 to oscillate in a vertical plane.

It will also be evident that since the ends 14, 14 of the yoke abut against the ends of the bearings 9, 9 no endwise motion of the yoke is permitted. However, adjustment of the trunnion bearings in this direction is permitted by means of the adjusting bolts 7, 7 as above outlined.

A pair of bearing races 18, 18 are provided within the yoke and between its top 15 and bottom 16. These races are substantially channel-shaped members having a web 19, upper race 20 and lower race 21. The inner faces of the races 20 and 21 slope upwardly from or diverge in a direction away from the web 19. The bearing races 18 have means, shown as the stud bolts 22 on their outer surfaces to form guides or bearing members against the sides of the top and bottom of the yoke. If desired other means such as ribs, keys or the like may be used, it being merely essential that the members 18, 18 be allowed a sliding fit along the yoke.

The web 19 bears against the inner end of adjusting screw 13 by means of which the web is limited in its travel toward the end of the yoke.

The free end of a leaf spring 23 is shown in Fig. 5 to project inwardly of the casing 1 and may consist of one or more leaves. These leaves are shown to carry shoes 24, 24. These shoes are held on the edges of the leaf spring within the race-ways 20 and 21 and their outer surfaces 25 and 26 are parallel respectively to the inner surfaces of the members 20 and 21.

An anti-friction means occupies this space between the races 20, 21 and the opposite surfaces 25 and 26 of the shoes 24. This anti-friction means comprises a cage 27 made of spring metal. The cage 27 has a series of recesses 28 in its upper and lower sides and each recess provides for a roller bearing 29.

Each roller bearing 29 has pins 30 extending beyond the ends thereof and being received in the cage 27 either in the apertures 31 in the ends of the cage or in apertured lugs 32. I have shown two rollers above and also below each of the shoes 24 but this may be reduced to one roller or the number further increased dependent upon what is found most desirable.

It will now be apparent that I have provided a spring connection which will relieve the spring from all stresses except those arising directly from the weight, or operation of the vehicle. Thus, oscillation of the spring in a horizontal plane will be allowed by the turning of the whole casing at the pivotal connections 2—3. Binding from misalignment of the spring mounting, or from distortion under side thrusts is thus impossible.

Oscillation in a vertical plane, such as would be caused by the normal flexing of the spring under varying loads is permitted by the pivotal connection of the yoke in the anti-friction bearings 9—9, the packing at 7' yielding sufficiently to prevent straining the casing 1, while such longitudinal movement as naturally occurs owing to the flexing of the spring is allowed by the movement of the roller bearings, and without appreciable friction.

It will be apparent that the upward thrust of the spring acting through the shoes 24, and rollers 29 against the races 18, will have a tendency to spread the latter owing to the inclination of the surfaces 20 and 25, and also that this spreading will be resisted by the adjusting screws 13. It is therefore possible by manipulation of the said screws to obtain the correct clearance between the races and rollers and insure freedom of motion without looseness.

It is possible also by tightening one screw and loosening the other to adjust the position of the spring leaf laterally, there being sufficient clearance between the webs 19 of the races and the ends 14 of the yoke to permit this. In the case of a vehicle, adjustments of wheel alignment might be made in this way.

It is obvious that the working parts of the device may be effectively lubricated by packing the housing 1 with grease or the like, and that the same will be retained therein by the packing 7'. The same means will of course also act to exclude dirt and water.

While I have for convenience limited my description to a mounting for a vehicle spring, it is to be understood that my invention is applicable to any situation where it is necessary to mount a member in such a way that it may reciprocate freely to a certain extent and also oscillate freely. I accordingly do not wish to be limited to a vehicle spring mounting, but desire to embrace any variation in structure or use of my invention falling within the scope of the subjoined claims.

What I claim is:

1. In a vehicle spring connection a frame member, a housing vertically pivoted to said frame member, a yoke horizontally pivoted in said housing, races mounted in said yoke, rollers running in said races, shoes guided and supported by said rollers, and a leaf spring carried by said shoes.

2. In a vehicle spring connection a frame member, a housing vertically pivoted to said frame member, a yoke horizontally pivoted in said housing, races slidably mounted in said yoke, means for adjusting the position of said races in said yoke, rollers running in said races, shoes guided and supported by said rollers, and a leaf spring carried by said shoes.

3. In a vehicle spring connection a frame member a housing vertically pivoted to said frame member, an opening in said housing, a yoke horizontally pivoted in said housing, races slidably mounted in said yoke, means for adjustably urging said races toward each other, rollers running in said races, wedge shaped shoes guided and supported by said rollers, and a spring leaf extending through said opening and carried by said wedge shaped shoes.

4. In a vehicle spring connection a frame member, a housing vertically pivoted to said frame member an opening in said housing, end plates for said housing, one of said end plates being longitudinally adjustable, anti-friction bearings carried in said end plates, trunnions carried in said bearings, a yoke connecting said trunnions and carried by said bearings so as to be adjustably pivoted without friction in said housing, races slidably mounted in said yoke, means for adjustably urging said races toward each other, rollers running in said races, wedge shaped shoes guided and supported by said rollers, and a spring leaf extending through said opening and carried by said shoes.

5. In a vehicle spring connection a frame member, a housing vertically pivoted to said frame member, adjustable anti-friction bearings mounted in said housing, a yoke horizontally pivoted in said adjustable anti-friction bearings races mounted in said yoke, rollers running in said races, shoes guided and supported by said rollers, and a leaf spring carried by said shoes.

In testimony whereof, I affix my signature.

EDWARD B. ZIMMERMAN.